(12) United States Patent
Honda

(10) Patent No.: US 7,355,815 B2
(45) Date of Patent: Apr. 8, 2008

(54) RECORDING MEDIUM CARTRIDGE AND RECORDING/REPRODUCING APPARATUS THEREOF

(75) Inventor: Yoshio Honda, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 484 days.

(21) Appl. No.: 10/644,769

(22) Filed: Aug. 21, 2003

(65) Prior Publication Data

US 2004/0042122 A1    Mar. 4, 2004

(30) Foreign Application Priority Data

Sep. 2, 2002    (JP) ............... 2002-256637

(51) Int. Cl.
*G11B 23/02*    (2006.01)
*G11B 23/30*    (2006.01)

(52) U.S. Cl. .................................. 360/132

(58) Field of Classification Search ............ 360/132, 360/133; 720/725, 728, 729
See application file for complete search history.

(56) References Cited

U.S. PATENT DOCUMENTS

| | | | |
|---|---|---|---|
| 5,708,545 A * | 1/1998 | Goken et al. ............ | 360/132 |
| 6,065,701 A | 5/2000 | Tanimura et al. | |
| 6,680,817 B1 * | 1/2004 | Kano et al. ............. | 360/132 |
| 6,856,486 B2 * | 2/2005 | Onmori et al. .......... | 360/132 |
| 7,023,661 B2 * | 4/2006 | Tahara .................... | 360/132 |
| 2001/0011012 A1 * | 8/2001 | Hino et al. .............. | 455/90 |
| 2001/0043436 A1 * | 11/2001 | Onmori et al. .......... | 360/132 |
| 2003/0002214 A1 * | 1/2003 | Kitamura et al. ........ | 360/132 |
| 2004/0004789 A1 * | 1/2004 | Watanabe et al. ....... | 360/132 |

FOREIGN PATENT DOCUMENTS

| | | | | |
|---|---|---|---|---|
| JP | 10177776 A | * | 6/1998 | |
| JP | 10214476 A | * | 8/1998 | |
| JP | 10214477 A | * | 8/1998 | |
| JP | 10269744 A | * | 10/1998 | |
| JP | 11231782 A | * | 8/1999 | |
| JP | 2000057736 A | * | 2/2000 | |
| JP | 2000090637 A | * | 3/2000 | |
| JP | 2000339914 A | * | 12/2000 | |
| JP | 2001118327 A | * | 4/2001 | |
| JP | 2001243438 A | * | 9/2001 | |
| JP | 2001256759 A | * | 9/2001 | |
| JP | 2001-332064 A | | 11/2001 | |
| JP | 2002117644 A | * | 4/2002 | |
| JP | 2002140879 A | * | 5/2002 | |

OTHER PUBLICATIONS

English-machine translation of Japanese Patent Application No. 2002-117644 A.*

* cited by examiner

*Primary Examiner*—William J Klimowicz
(74) *Attorney, Agent, or Firm*—Sughrue Mion, PLLC

(57) ABSTRACT

The recording medium cartridge of the invention can keep superiority in supplying a power source and realize a high capacity of an IC chip and an improvement of communications performance, with a cartridge memory being able to be flexibly arranged in a cartridge case. The cartridge has a cartridge memory and the memory is separately composed so that the IC chip is electrically connected with an antenna

20 Claims, 4 Drawing Sheets

RECORDING MEDIUM CARTRIDGE AND RECORDING/REPRODUCING APPARATUS THEREOF

FIELD OF THE INVENTION

The present invention relates to a recording medium cartridge with a cartridge memory.

BACKGROUND OF THE INVENTION

As described in page 2 and FIGS. 7 and 8 of Japan patent laid open publication 2001-332064, a recording medium cartridge provided with a recording medium such as a magnetic tape is equipped with a cartridge memory to memorize manufacture information such as a manufacturer and manufacture number and usage history information such as a user and usage date.

As shown in FIG. 1A, such the cartridge memory is housed in a cartridge case 110 of a recording medium cartridge. As shown in FIG. 1B, the cartridge memory 100 housed in the cartridge case 110 is formed with a loop antenna 100b and IC chip 100c being provided on a board 100a of a rectangular sheet made of resin, The IC chip 100c is protected by being sealed in a globe top 100d which is a sealant made of resin.

In such the cartridge memory 100, the IC chip 100c is electrically connected with the loop antenna 100b which is print-wired on the board 100a and data is sent/received to and from an outside of a magnetic tape cartridge with no contact by propagating electromagnetic waves to the loop antenna 100b from an electromagnetic wave sending means provided in recording/reproducing apparatus. Moreover, a power source to drive the IC chip 100c is also supplied by propagating the electromagnetic waves from the electromagnetic wave sending means provided in the recording/reproducing apparatus.

However, in a magnetic tape cartridge as shown in FIGS. 1A and 1B, the cartridge memory 100 is arranged at a corner in the cartridge case 110 not to impede a travel of a magnetic tape MT. Therefore, a size of the board 100a must be made so that it can be housed at a corner of the cartridge case 110, and a size of the loop antenna 100b provided on the board 100a is also limited by the size of the board 100a. If the size of the loop antenna 100b is limited, a driving power source for an IC chip supplied from an external recording/reproducing apparatus is also restricted, thereby a realization of high capacity of an IC chip becoming difficult.

SUMMARY OF THE INVENTION

The object of the present invention is to provide a recording medium cartridge which can realize a high capacity of an IC chip and an improvement of communications performance without a size and position of a loop antenna being limited.

The recording medium cartridge related to the invention is characterized in that the cartridge is composed of a cartridge case, recording medium housed in the cartridge case, and cartridge memory at least part of which is housed in the cartridge case, wherein the cartridge memory is separately composed so that the IC chip is electrically connected with the antenna.

The recording medium cartridge related to the invention enables arrangement places of the IC chip and antenna in the cartridge memory to be flexible by separately composing the IC chip and antenna in the cartridge case. Moreover, the antenna can be enlarged according to some arrangement places, so a high capacity of a memory configuration can be realized by enlarging a power supply source. Furthermore, comparing the cartridge with a conventional one in which an arrangement position of electromagnetic wave sending means of a recording/reproducing apparatus is limited, a flexibility of designing the recording/reproducing apparatus is increased.

DESCRIPTION OF THE PREFERRED EMBODIMENTS

The embodiments related to the invention are described in detail hereinafter referring to drawings as needed. Meanwhile, the embodiments assume cases in which the invention is applied to a magnetic tape cartridge.

First Embodiment

Figure 1A:
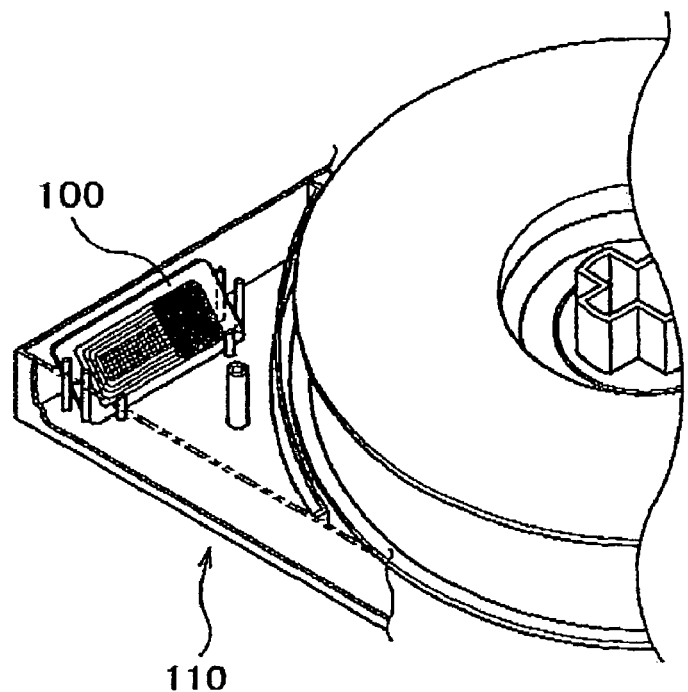
FIG. 1A is a perspective view showing a situation in which a conventional cartridge memory is attached to a cartridge case and FIG. 1B is a perspective view showing an appearance of the conventional cartridge memory.
Figure 1B:
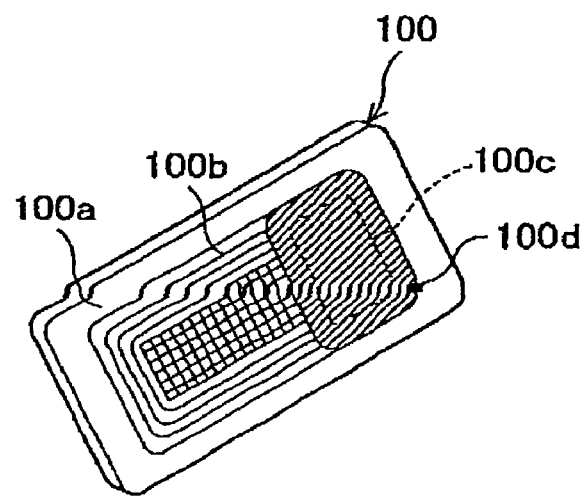
Figure 2:
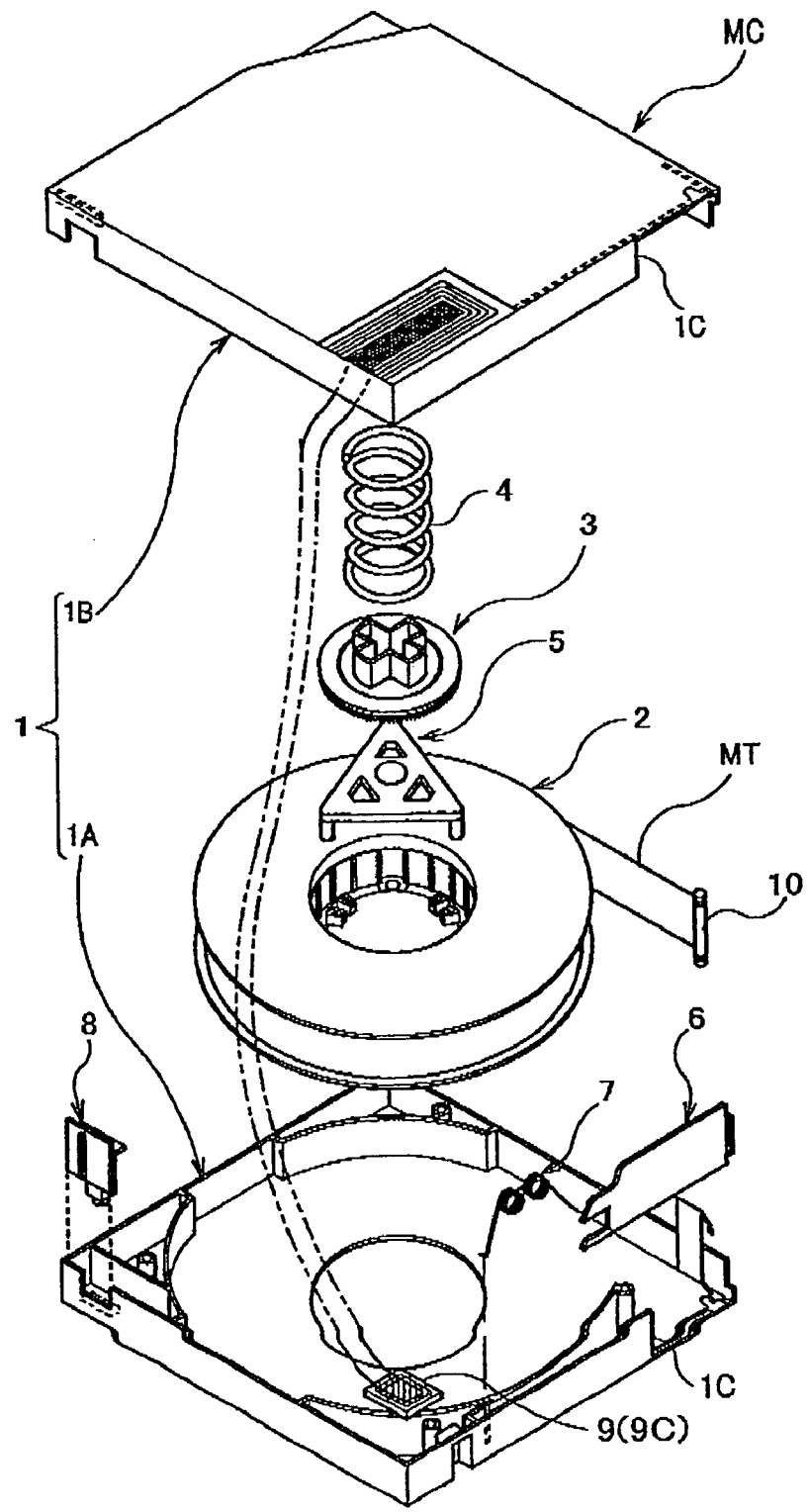
FIG. 2 is an exploded perspective view showing a configuration of a magnetic tape cartridge related to the embodiment.
Figure 3:
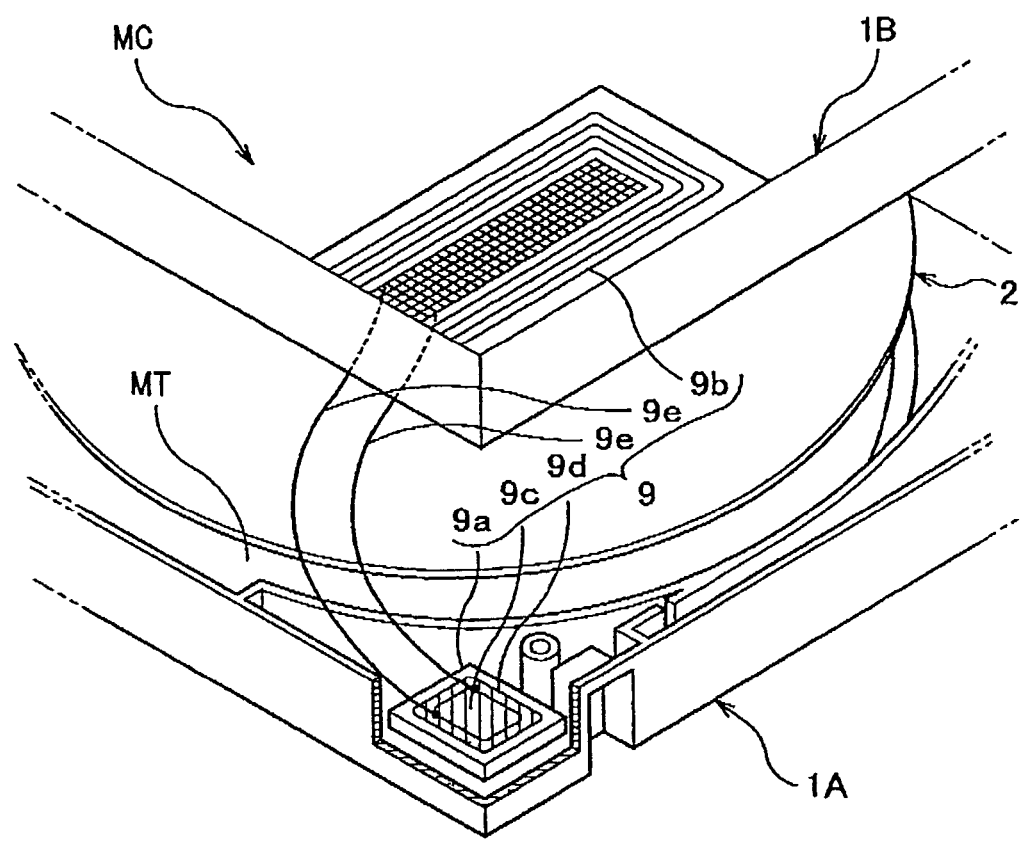
FIG. 3 is a perspective view showing a situation in which a cartridge memory is attached to a cartridge case related to a first embodiment of the invention.

Firstly, a first embodiment of a magnetic tape cartridge related to the invention is described referring to FIGS. 2 and 3.

As shown in FIG. 2, a magnetic tape cartridge MC is composed of a single reel 2 in which a magnetic tape MT which is a recording medium is wound, a leader pin 10 to pull out the magnetic tape MT from a ridge case 1, a lock plate 3 and compressing spring 4 to lock a rotation of the reel 2, a release pad 5 to unlock the reel 2, a slide door 6 to open/close a magnetic tape pulling-out port 1C formed over a lower half 1A and upper half 1B, a coiled spring 7 energizing the slide door 6 to a closing position of the magnetic tape pulling-out port 1C, a prevention claw 8 for an involuntary delete, a cartridge memory 9, and the like built in the cartridge case 1 which is divided into the lower half 1A and upper half 1B.

As shown in FIG. 3, the cartridge memory 9 is composed so that a loop antenna 9b is electrically connected with an IC chip 9 by a wiring 9e. In the cartridge memory 9, manufacture information of a magnetic medium cartridge 1 such as a manufacturer and manufacture number, usage history information of the cartridge 1 such as a user and usage date, and the like are recorded.

The loop antenna 9b electrically connected with the IC chip 9c has functions of supplying a power source and communicating data to the chip 9c.

The antenna 9b is formed by being printed on an outer surface of the upper half 1B of the cartridge case 1. For forming the antenna 9b, a method such as printing it on the cartridge case 1 made of synthetic resin with a conducting ink and hardening the ink (conducting paste) is used. Here, as main compositions of the conducting paste, thermosetting resins using such as a phenol resin, epoxy resin, and melamine resin, thermoplastic resins using such as an acrylic resin, butyral resin, and polyester resin, or mixed ones of these resins and organic solvents are utilized. In this connection, it is convenient to connect the antenna 9b with the IC chip 9c if the antenna 9b is arranged at a position at which the antenna 9b and chip 9c housed in the cartridge case 1 mutually correspond to each other at an inside and outside of the case 1.

Meanwhile, the chip 9c is protected by being sealed in a globe top 9d which is a sealant made of resin.

The chip 9c is electrically connected with the antenna 9b formed of the conducting paste on an outer surface of the cartridge case 1 by the wiring 9e. The chip 9c sends/receives data to and from an outside of the magnetic tape cartridge MC by propagating electromagnetic waves to the antenna 9b from the outside of the tape cartridge MC. Moreover, the power source to drive the chip 9c is also supplied by propagating the electromagnetic waves from the outside of the tape cartridge MC.

Meanwhile, the IC chip 9c is arranged at a corner of the lower half 1A of the cartridge case 1 not to impede a travel of the magnetic tape MT (see FIG. 3).

According to the above mentioned content, the first embodiment can obtain the following effects.

Because in the cartridge memory 9 the IC chip 9c and loop antenna 9b are separately composed and the antenna 9b is printed on the cartridge case 1, an IC chip can be arranged at a space at which a conventional cartridge memory arranging these on one board cannot arrange the chip. Thus, an arrangement place of the chip in the cartridge case 1 can be made flexible.

Moreover, because the antenna 9b is printed on the cartridge case 1, it is unnecessary to consider its arrangement space. Therefore, a winding number of the antenna 9b can be increased and the antenna itself can be largely formed, so a high capacity of a memory configuration can be realized by enlarging a power supply source.

Furthermore, the antenna 9b is printed on the outer surface of the cartridge case 1, thereby printing work being able to be facilitated. Therefore, an assembling process of the recording medium cartridge can be simplified and productivity is also excellent. In addition, electromagnetic waves are propagated on the outer surface of the cartridge case 1, so the antenna 9b can be arranged without regard for directions of the electromagnetic waves Second Embodiment Then, a variation example of the invention is described. Meanwhile, in the description below, same parts of description of the first embodiment are omitted in detailed description by adding the same symbols.

Figure 4:
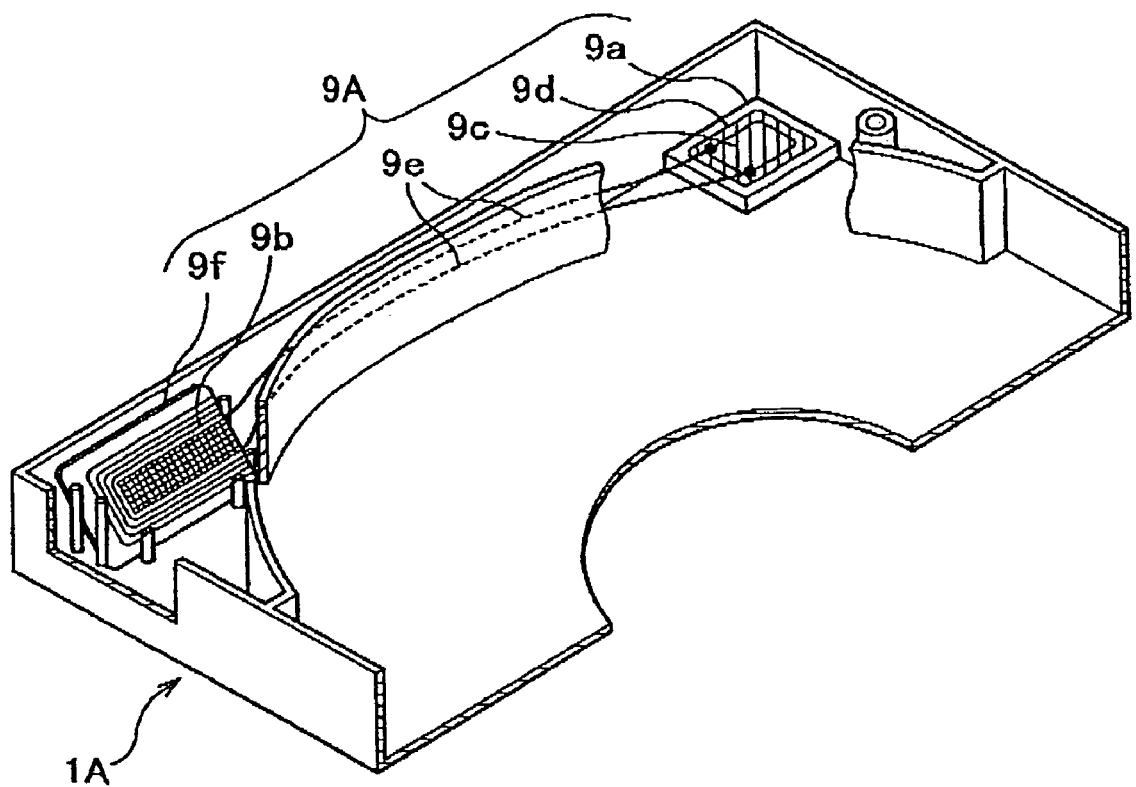
FIG. 4 is a perspective view showing a situation in which a cartridge memory is attached to a cartridge case related to a second embodiment of the invention.

As shown in FIG. 4, a cartridge memory 9A is composed so that the loop antenna 9b and IC chip 9c are electrically connected by the wiring 9e, and is attached to the magnetic tape cartridge MC.

The antenna 9b is formed by being printed with a conducting paste on a board 9f made of synthetic resin. The conducting paste is made according to the same method described before.

The antenna 9b is arranged at a corner of the lower half 1A of the cartridge case 1 so as to be convenient to propagate electromagnetic waves.

The chip 9c is protected on the board 9a made of resin by being sealed in the globe top 9d which is a sealant made of resin.

The chip 9c is electrically connected with the antenna 9b formed of the conducting paste on the outer surface of the cartridge case 1 by the wiring 9e and is arranged at a corner different from that at which the antenna 9b is arranged.

Meanwhile, the chip 9c and antenna 9b thus arranged does not impede a travel of the magnetic tape MT.

According to the above mentioned content, the second embodiment can obtain the following effects.

Because in the cartridge memory 9A the IC chip 9c and loop antenna 9b are separately composed, each can be separately arranged at a space at which a conventional cartridge memory arranging these on one board cannot arrange these. Thus, arrangement places of an IC chip and antenna in the cartridge case 1 can be made flexible. In addition, the memory 9A can also be composed of a plurality of the antennas 9b or chips 9c.

Moreover, because each of the antenna 9b and chip 9c is separately composed, each size can be formed smaller than that of a conventional cartridge memory. Therefore, the antenna 9b or chip 9c itself can be enlarged matching a housing space, so a memory configuration with a high capacity can be realized by enlarging a power supply source and the like.

The embodiments of the invention are described as above, but the invention is not limited to such the embodiments and is available for various variations as far as embodiments are based on the technical ideas of the invention.

Although the embodiments are composed so that the loop antenna 9b is printed on the outer surface of the upper half 1B of the cartridge case 1, the invention is not limited to this and, for example, the effects of the invention can be obtained even in the case of it being printed on an outer surface of the lower half 1A. In this connection, in the case of it being printed on the outer surface of the lower half 1A, it is preferable to overcoat a loop antenna to be protected.

Moreover, to print the loop antenna is not limited to the outer surface of the cartridge case 1 and any of the inner surface or inner/outer side surface is acceptable. Thus, with an arrangement being flexible, a position which is most convenient for a propagation of electromagnetic waves can be selected.

Not to mention that a shape, size, and arrangement of an IC chip and loop antenna is changeable as needed, anything can obtain similar effects unless a movement of a magnetic tape inside the magnetic cartridge tape MT is impeded.

Although cases are assumed in the embodiments that a magnetic tape is applied as a recording medium, an optical recording tape is also applicable not limited to a magnetic tape. Moreover, not limited to a tape, a disk is also applicable as the recording medium.

What is claimed is:

1. A recording medium cartridge comprising:
a cartridge case;
a recording medium housed in the cartridge case; and
a cartridge memory at least part of which is housed in said cartridge case,
wherein said cartridge memory comprises an IC chip and an antenna electrically connected to said IC chip;
wherein said antenna is spaced apart from said IC chip;
wherein said IC chip is formed on a first board and the antenna is formed on a second board;
wherein said second board is separate and spaced apart from the first board, and
wherein at least a portion of the electrical connection between the IC chip and the antenna is not supported by either one of the first board and the second board.

2. A recording medium cartridge according to claim 1, wherein said antenna is a printed antenna.

3. A recording medium cartridge according to claim 2, wherein said antenna is printed with a conducting paste.

4. A recording medium cartridge according to claim 3, wherein said antenna is overcoated.

5. A recording medium cartridge according to claim 4, wherein said antenna is arranged at a corner inside said cartridge case.

6. A recording medium cartridge according to claim 3, wherein said antenna is arranged at a corner inside said cartridge case.

7. A recording medium cartridge according to claim 2, wherein said antenna is overcoated.

8. A recording medium cartridge according to claim 7, wherein said antenna is arranged at a corner inside said cartridge case.

9. A recording medium cartridge according to claim 2, wherein said antenna is arranged at a corner inside said cartridge case.

10. A recording medium cartridge according to claim 1, wherein said antenna is arranged at a corner inside said cartridge case.

11. A recording medium cartridge according to claim 1, wherein said cartridge comprises a plurality of said antennas or said IC chips.

12. A recording medium cartridge comprising:
a cartridge case;
a recording medium housed in the cartridge case; and
a cartridge memory at least part of which is housed in said cartridge case,
wherein said cartridge memory comprises an IC chip and an antenna electrically connected to said IC chip;
wherein said antenna is spaced apart from said IC chip;
wherein said IC chip is formed on an IC chip board and the antenna is spaced apart from the IC chip board; and
wherein said antenna is printed on an outer surface of said cartridge case.

13. A recording medium cartridge according to claim 12, wherein said antenna is overcoated.

14. A recording medium cartridge according to claim 12, wherein said antenna is arranged at a corner inside said cartridge case.

15. A recording medium cartridge comprising:
a cartridge case;
a recording medium housed in the cartridge case; and
a cartridge memory at least part of which is housed in said cartridge case,
wherein said cartridge memory comprises an IC chip and an antenna electrically connected to said IC chip;
wherein said antenna is spaced apart from said IC chip;
wherein said antenna is disposed at a first corner inside said cartridge case and said IC chip is disposed at a second corner inside said cartridge case.

16. A recording medium cartridge according to claim 15, wherein said IC chip is formed on an first board and the antenna is spaced apart from the first board.

17. A recording medium cartridge according to claim 16, wherein said antenna is formed on a second board and the second board is spaced apart from the first board.

18. A recording medium cartridge comprising:
a cartridge case;
a recording medium housed in the cartridge case; and
a cartridge memory at least part of which is housed in said cartridge case,
wherein said cartridge memory comprises an IC chip and an antenna electrically connected to said IC chip;
wherein said antenna is spaced apart from said IC chip;
wherein said IC chip is disposed on a board at a corner of said cartridge case and inside said cartridge case and said antenna is printed on an outside of the cartridge case.

19. A recording medium cartridge according to claim 18, wherein the board is disposed on a bottom wall of the cartridge case and the antenna is printed on a top wall of the cartridge case.

20. A recording medium cartridge according to claim 19, wherein the board and the antenna are located at the same corner of the cartridge case.

* * * * *